US008840397B2

(12) United States Patent
Schottli

(10) Patent No.: US 8,840,397 B2
(45) Date of Patent: Sep. 23, 2014

(54) DEVICE FOR PRODUCING A THIN-WALLED ELONGATE BODY SUCH AS A PIPETTE OR A TIP

(75) Inventor: Martin Schottli, Basadingen (CH)

(73) Assignee: Schöttli AG, Diessenhofen (CH)

( * ) Notice: Subject to any disclaimer, the term of this patent is extended or adjusted under 35 U.S.C. 154(b) by 133 days.

(21) Appl. No.: 13/696,896

(22) PCT Filed: Mar. 4, 2011

(86) PCT No.: PCT/CH2011/000041
§ 371 (c)(1),
(2), (4) Date: Nov. 8, 2012

(87) PCT Pub. No.: WO2011/143784
PCT Pub. Date: Nov. 24, 2011

(65) Prior Publication Data
US 2013/0059027 A1    Mar. 7, 2013

(30) Foreign Application Priority Data
May 21, 2010   (CH) .......................................... 803/10

(51) Int. Cl.
*B29C 45/36*    (2006.01)
(52) U.S. Cl.
USPC ....................................................... 425/577

(58) Field of Classification Search
USPC ......................................... 425/574, 575, 577
See application file for complete search history.

(56) References Cited

U.S. PATENT DOCUMENTS

| | | | | |
|---|---|---|---|---|
| 4,565,518 A | * | 1/1986 | Altman et al. ................ | 425/568 |
| 4,958,676 A | * | 9/1990 | Kuntz ............................ | 425/577 |
| 5,034,170 A | * | 7/1991 | Briggs et al. ................. | 425/577 |
| 5,061,168 A | * | 10/1991 | Fox ....................... | 425/DIG. 58 |
| 5,193,133 A | * | 3/1993 | Schofield et al. .............. | 385/85 |
| 6,284,160 B1 | | 9/2001 | Kiernicki et al. | |
| 2008/0179792 A1 | | 7/2008 | Kurimoto et al. | |

FOREIGN PATENT DOCUMENTS

| | | |
|---|---|---|
| EP | 0076980 | 4/1983 |
| EP | 2078600 | 7/2009 |

* cited by examiner

*Primary Examiner* — Tim Heitbrink
(74) *Attorney, Agent, or Firm* — Volpe and Koenig, P.C.

(57) ABSTRACT

A device for producing a thin-walled elongate body from thermoplastic material includes a removable sleeve (25) and a bush (33), the casing of the removable sleeve (25) and the bore (31) in the bush (33) are arranged eccentrically with respect to the axis of symmetry of the core and, by rotation relative to one another, a displacement of the core can be achieved both in terms of magnitude and also in relation to a deflection angle.

8 Claims, 6 Drawing Sheets

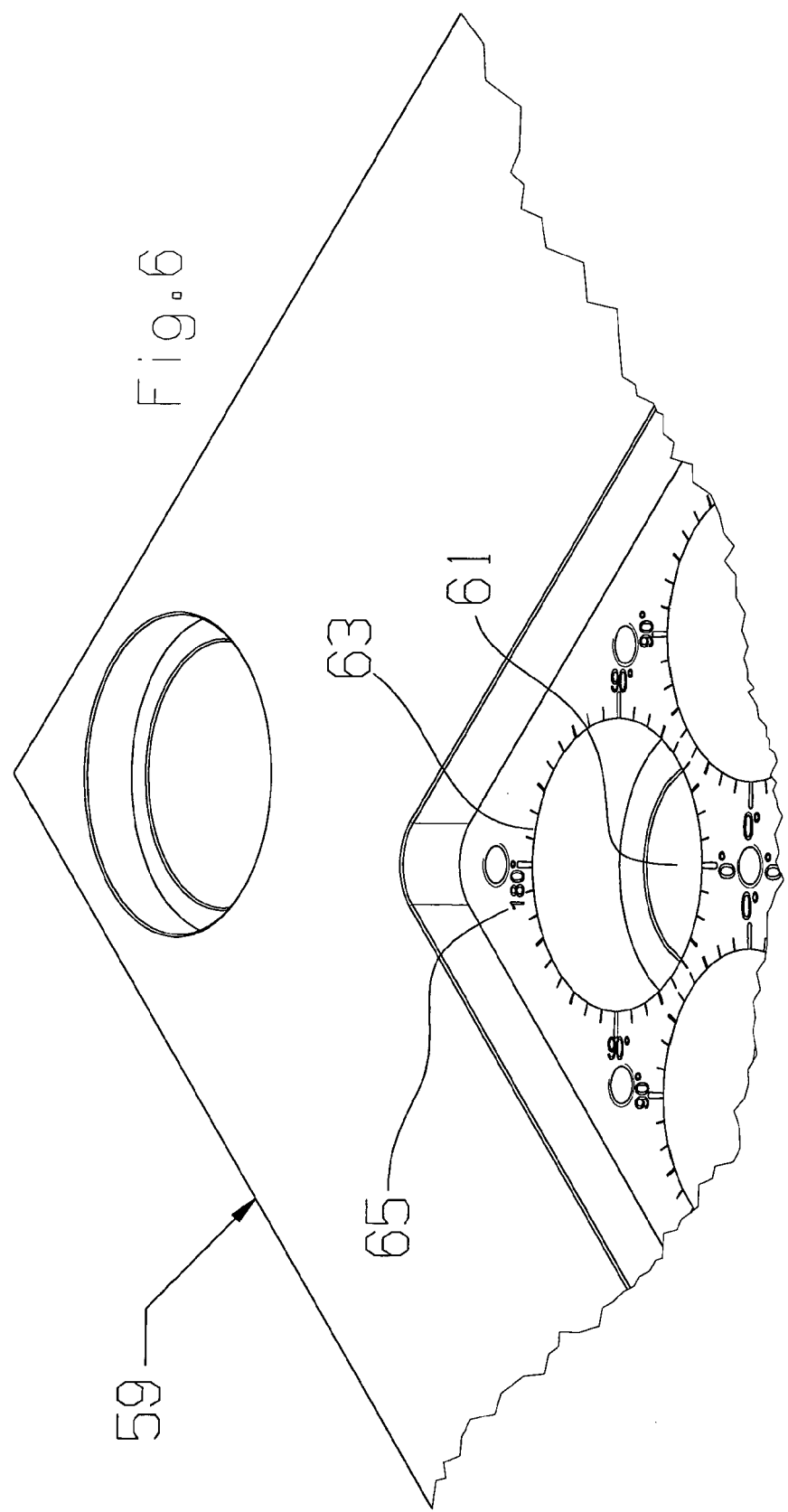

DEVICE FOR PRODUCING A THIN-WALLED ELONGATE BODY SUCH AS A PIPETTE OR A TIP

BACKGROUND

The field of the invention is a device for producing a thin-walled elongate body, such as a pipette or a tip.

When producing thin-walled elongate bodies, such as particularly pipettes or tips, the problem arises that no rotary symmetrical parts are produced due to off-setting and tolerances in the tool. This means that during automatic pipetting the outlet opening for the liquid to be pipetted is not located at the predetermined position. Such unsymmetric pipettes may lead to problems and/or they represent rejects.

SUMMARY

An objective of the present invention comprises to provide a device, which allows the production of thin-walled elongate bodies, with their wall thicknesses being constant, i.e. after the production their tip is located on the geometric axis of symmetry of the body. Another objective of the invention comprises to embody the device such that deviations determined can be corrected in a simple fashion directly at the injection molding tool.

This objective is attained in a device according to the invention. Advantageous embodiments of the device are described below.

This is achieved by the eccentric embodiment of the eccentric bush and the removable sleeve engaging each other such that the position of the core can be aligned by a simple rotary motion of one of the two elements.

BRIEF DESCRIPTION OF THE DRAWINGS

Based on an illustrated exemplary embodiment the invention is explained in greater detail. It shows:

FIG. 6 is a detail of the first mold halves—ejection side, and

DETAILED DESCRIPTION OF THE PREFERRED EMBODIMENTS

Figure 1:
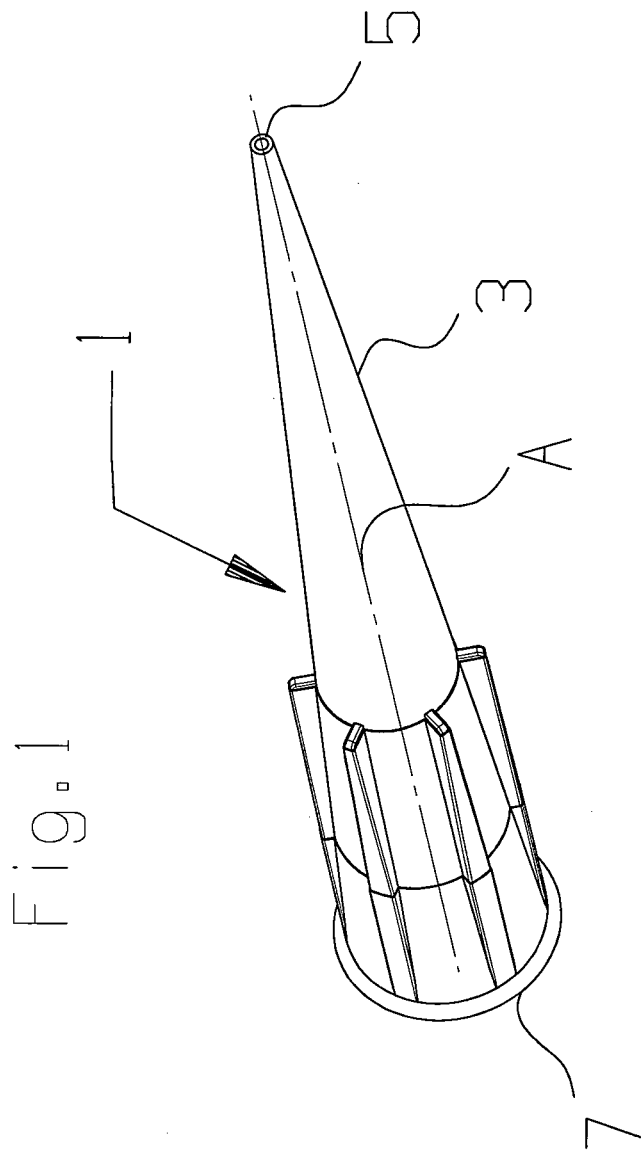
FIG. 1 is a perspective view of a thin-walled elongate body based on a pipette.

In FIG. 1, a pipette is marked with the reference character 1 as an example for a thin-walled elongate body. It is embodied conically tapering at the right side, i.e. as a hollow, acute-angled frustum 3. The front end shows a diameter of 0.75 mm, for example, and an outlet opening 5 of 0.45 mm. In other words the wall thickness (thickness of the wall) amounts to only 0.15 mm. At the left side, a flange 7 is discernible at the frustum 3, which is intended to connect the pipette 1 to and/or with a pipetting device. Instead of a conically extending pipette 1, of course a body with a cylindrical sleeve can also be used.

Figure 2:
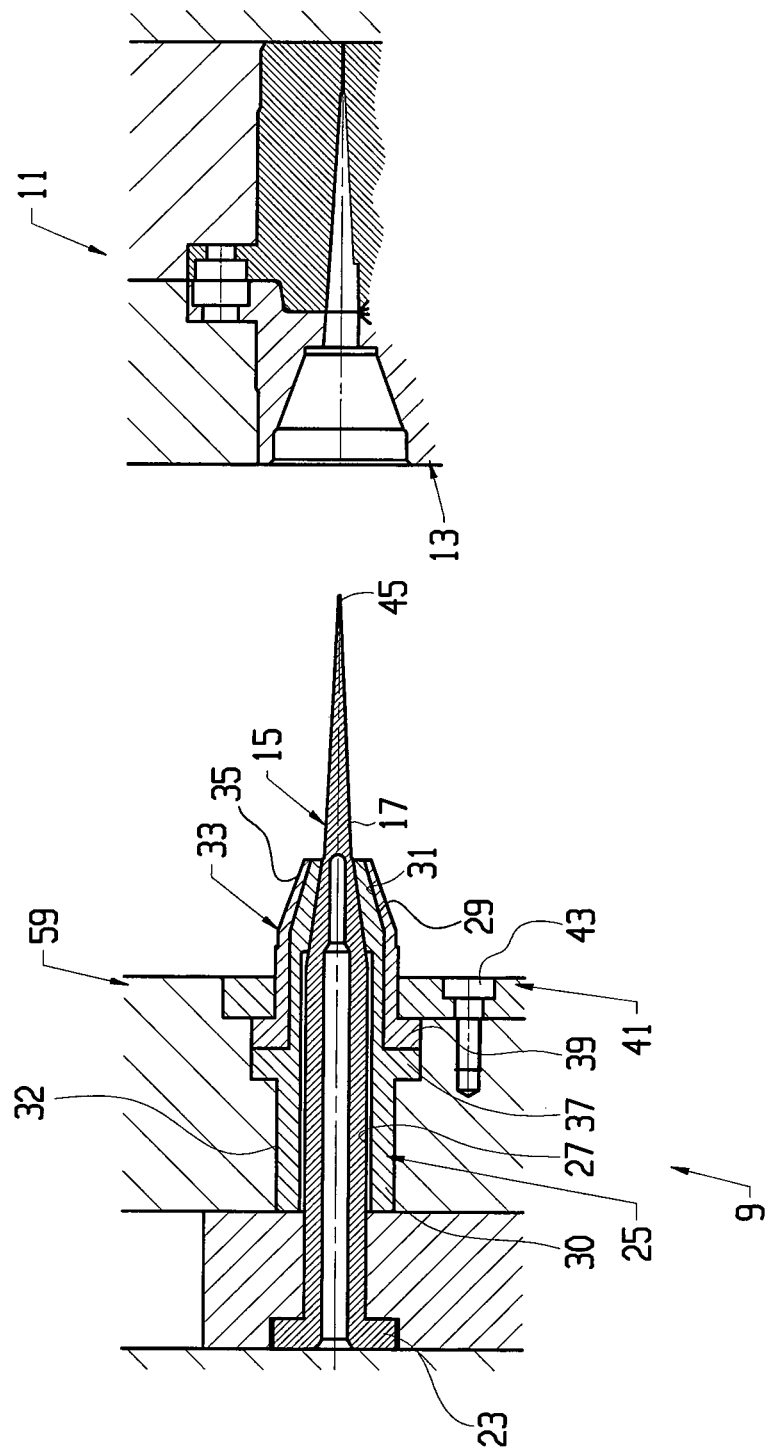
FIG. 2 is a cross-sectional view through an injection tool for a pipette.

FIG. 2 shows at the left side details of a first mold half (ejection side) of the injection mold 9, mold half 9 for short, and on the right side the second mold half (nozzle side) of the injection mold 11, mold half 11 for short. The second mold half 11 includes a matrix 13, which forms the exterior contour of the pipette 1, i.e. of the work piece.

Figure 3:
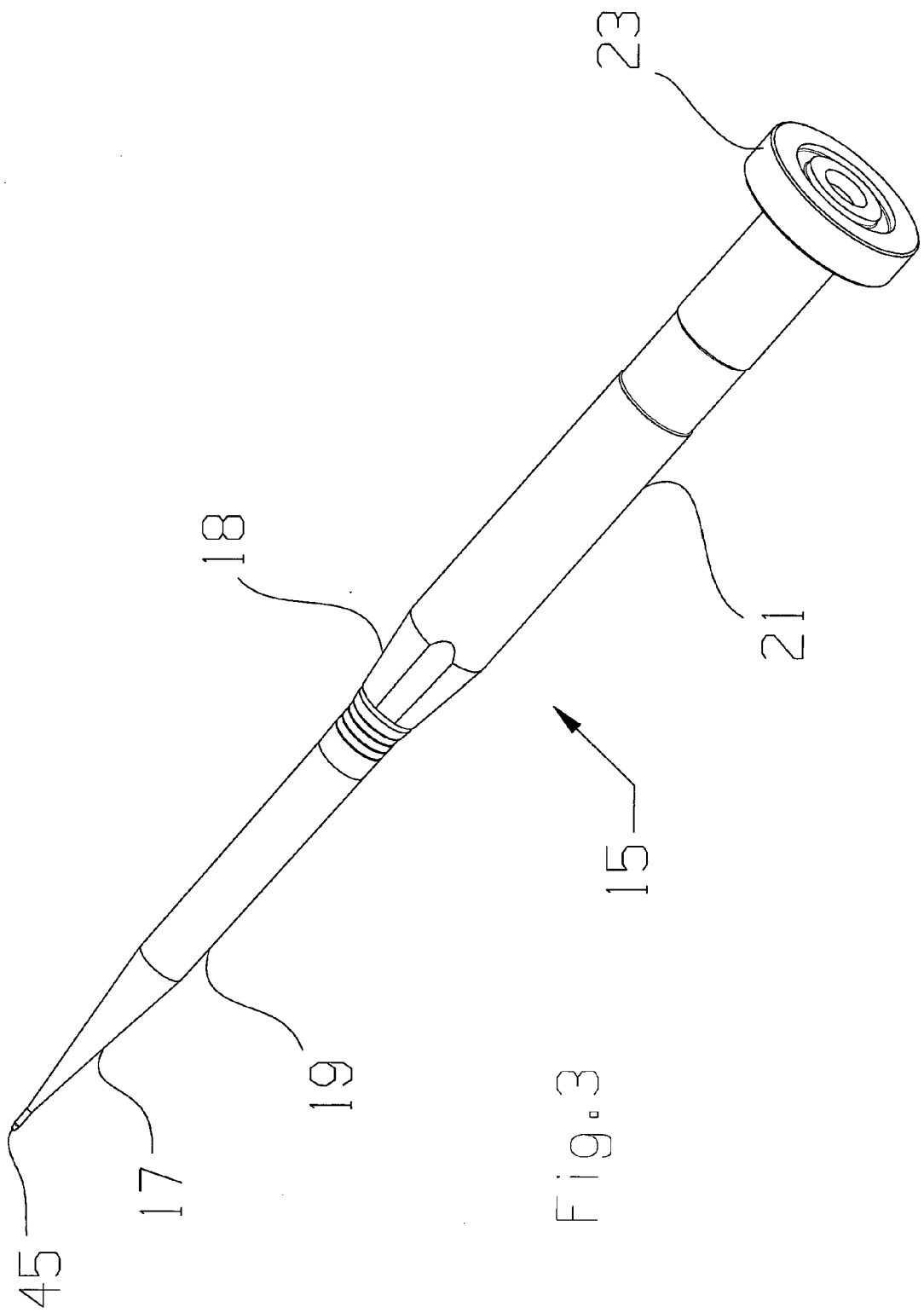
FIG. 3 is a perspective view of the core of the tool.

The first mold half 9 (left) carries the core 15, which forms the interior contour of the pipette 1 and comprises several parts. The molding part, i.e. the core 15, is shown in FIG. 3 in an enlarged fashion. At the top it comprises a tip 45 and subsequently an acute frustum 17, which forms the interior space of the acutely tapering area of the pipette 1. Here, a cylindrical or conical section 19 follows, which forms the rear section of the pipette 1. The section 21 located at the bottom in FIG. 3 ends in a flange 23, by which the core 15 is fastened at the first mold half 9 of the tool 9. The core 15 is surrounded by a removable sleeve 25.

The removable sleeve 25 comprises an axially symmetrical bore 27, with its diameter exhibiting a diameter in the rear part which is greater than the exterior diameter of the core 15. In the front part, the bore 27 extends conically and essentially contacts the core 15 at the rear at the conical section 18. The core 15 is consequently connected on the one side by the flange 23 at the section 21 with the mold half 9 and at its conical section at the rear 18 via the removable sleeve 25 without any play. The casing 29 of the removable sleeve 25 is not embodied axially symmetrical but exhibits eccentricity, which for example may amount to 0.08 mm. The eccentricity comprises the cylindrical section of the removable sleeve 25 as well as the conically progressing section.

At the front of the removable sleeve 25 an eccentric bush is provided, called bush 33 for short, with its bore 31 being embodied congruent in reference to the casing 29 of the removable sleeve 25. The bore 31 of the bush 33 is also embodied eccentric in reference to the casing surface 35 of the bush 33, i.e. the casing surface 35 is located symmetrically in reference to the axis of symmetry of the bush 3; the bore 31 is eccentrically in reference to the axis of symmetry A.

The bush 33 is supported in an axial fashion with its rear end 39, embodied as a flange, on a circumferential flange-like web 37 of the removable sleeve 25. The cylindrical base 30 of the removable sleeve 25 can be inserted into the first mold half 9 in a cylindrical receiving bore 32. The removable sleeve 25 and the bush 33 are engaged on each other and protected from rotation in reference to each other by a fastening plate 41, on which the mold half 9 rests. The fastening plate 41 is held by at least one screw 43.

By the eccentric embodiment of the casing 29 on the removable sleeve 25 and the eccentric embodiment of the bore 31 in the bush 33, by a mutual rotation of the removable sleeve 25 and the bush 33, the position of the core 15 can be determined in a radial displacement, radially displaced by a predetermined range and simultaneously here the angular displacement. In other words, the conical area at the rear 18 of the core 15 is displaced from the axis of symmetry A by the removable sleeve 25 and the bush 33.

Figure 5A:
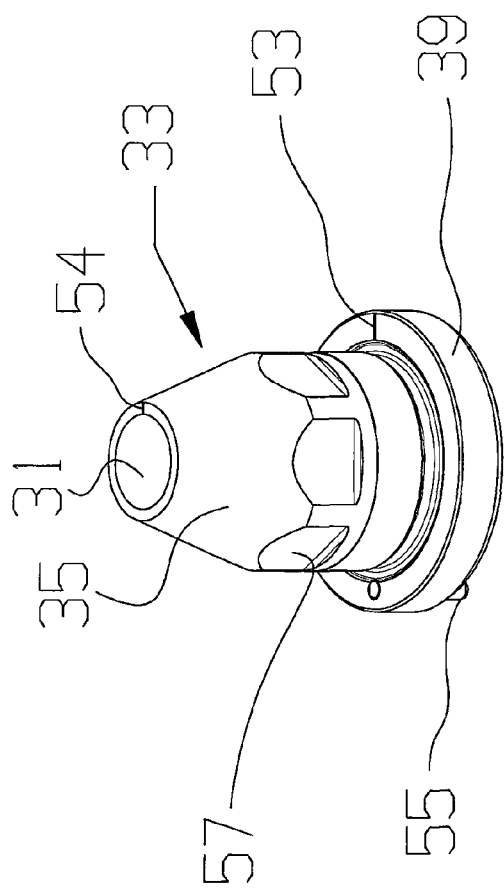
FIG. 5a is a perspective view of a bush.
Figure 5B:
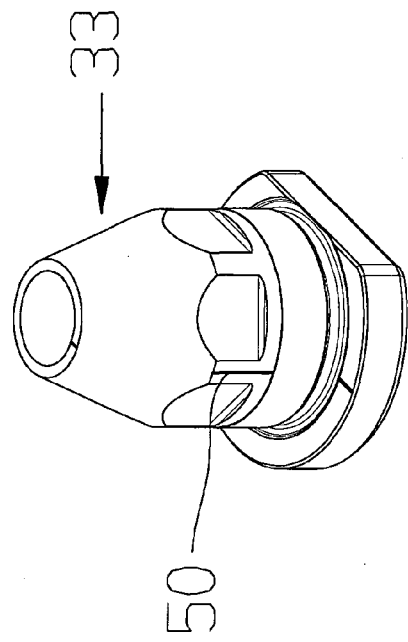
FIG. 5b is a view of a bush seen from a different angle.

Markings 49 are provided on the surface 47 of the flange-like web 37 at the removable sleeve 25, e.g., in the form of bumps or grooves. These markings 49 may be provided with numbers in order to allow identification. As an alternative to the bumps, bores may also be provided as markers, penetrating partially or entirely. Further, on the periphery of the circumferential web 37 at "0" a marking 51 is inserted or applied. Another marking 52 is applied at the widest position of the facial area. A marking 53 is also inserted or applied at the bush 33 (FIG. 5) on the top of the flange-like rear end 39. Between the key areas 57 of the bush 33 another marking 50 is applied. It is arranged with the marking 53 at the bush 33 in an alignment. Another marking 54 is applied at the widest point of the facial end. Further, at the bottom a pin 55 is inserted, intended and suitable to engage and/or latch in the markings 49 at the removable sleeve 25 in order to determine the adjusted angular rotary position between the removable sleeve 25 and the bush 33. Further, an option is provided at the bush 33 to attach an open-end wrench. For this purpose, at the perimeter key flanges 57 are provided similar to a hex nut.

Figure 7:
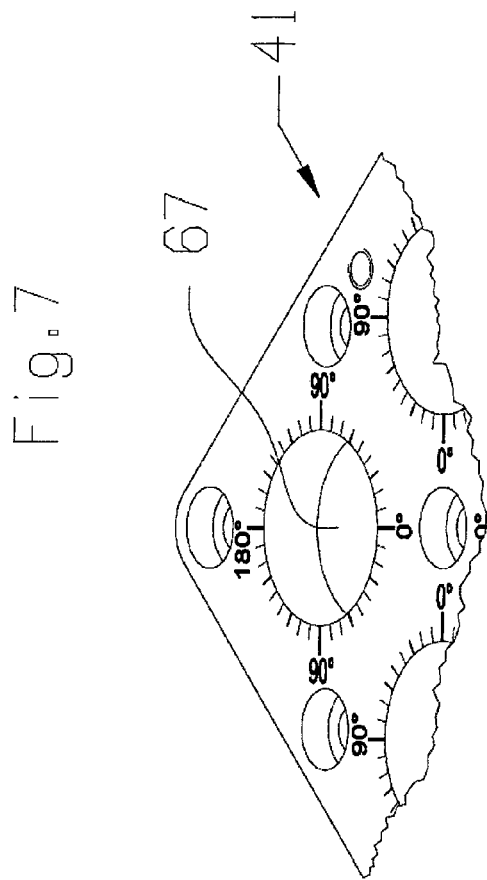
FIG. 7 is a perspective view of a fastening plate.
Figure 4:
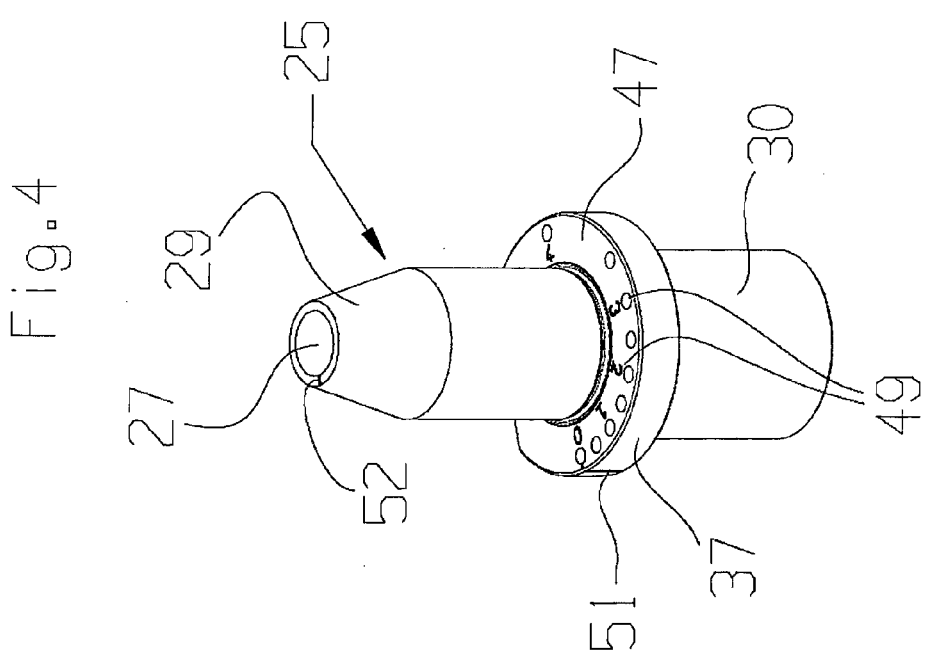
FIG. 4 is a perspective view of a removable sleeve.

FIGS. 6 and 7 show perspective illustrations of the fastening plate 41 (FIG. 7) as well as the mold plate (ejection side) 59. Receiving bores 61 are formed in the mold plate 49, into which the removable sleeves 25 can be inserted axially. Scales from +180° to −180° are respectively engraved at the edges 63 of the accepting bores 61. These scales 65 serve to position the removable sleeve 25 during the assembly and to fixate it in a new position upon correction thereof.

Holes 67 are in turn embodied on the fastening plate 41 (FIG. 7) aligned to the receiving bores 61 of the molding plate 59 and also markings of +/−180° are applied on its periphery.

During the assembly of the core 15 in the mold halves 9 the removable sleeve 25 and the bush 33 are assembled in each other such that the core 15 is subjected to a displacement/deflection known from experience. However, if it is now detected that either the amount of the displacement of the injection molded parts, here the pipette 1, deviates from the target value and/or its angular position from the target value, in an open injection mold (mold halves 9 and 11 spaced apart as in FIG. 2) the screw 43 can be released and the fastening plate 41 can be disassembled and the mutual position of the removable sleeve 25 and the bush 33 as well as the angular position of the two elements 25, 33 can be adjusted in reference to the molding plate AS 59. The adjustment can occur based on a table deducted from experiments. Such a readjustment of a core 15 can be performed within a few minutes and it is not required for the injection mold to be disassembled from the injection molding machine, here.

The invention claimed is:

1. A device for producing a pipette, a tip, or a thin-walled elongate body from a thermoplastic material in an injection molding machine, comprising an injection mold with a first mold half, which receives a core, and a second molding half, which receives a matrix, a position of the core is adjustable and changeable in reference to the matrix, the core (15) comprises a removable sleeve (25) and a bush (33) which can be plugged onto the removable sleeve (25) and which is rotational in reference to the removable sleeve (25) and a casing (29) of the removable sleeve (25) is eccentric in reference to an axis of symmetry A of the core (15), and a bore (31) is arranged in the bush (33) eccentric in reference to a casing area of the bush (35).

2. A device according to claim 1, wherein the casing (29) of the removable sleeve (25) and the bore (31) are embodied in the bush (33) congruent in reference to each other.

3. A device according to claim 2, wherein a flanged circumferential web (37) is provided on the removable sleeve (25) with at least a partially circumferential scale and a marking (51).

4. A device according to claim 3, wherein at least one of a flanged rear end (39) with an at least partially circumferentially extending scale or a marking (50, 53) is located on the bush (33).

5. A device according to claim 3, wherein markings (52, 54) are applied on annular facial areas of the removable sleeve (25) and the bush (33) at respectively widest or narrowest point of the wall.

6. A device according to claim 5, wherein the removable sleeve (25) comprises a cylindrical base (30), which is insertable into a cylindrical receiving bore (32) on the first mold half (9) such that the removable sleeve (25) can be clamped together with the bush (33) as a whole for positioning therein in a non-rotatable fashion and with a fastening plate (41) at the first mold half (9).

7. A device according to claim 1, wherein the removable sleeve (25) and the bush (33) are rotational in reference to one another such that a position of the core (15) can be displaced in a radial direction by the removable sleeve (25) or can be adjusted or changed in reference to an angular position in reference to the mold.

8. A device according to claim 7, wherein an amount for at least one of displacement or the angular position can be adjusted and changed based on empirical tables.

* * * * *